No. 733,696. PATENTED JULY 14, 1903.
L. CHRONIK.
BATTERY ELEMENT.
APPLICATION FILED NOV. 15, 1902.
NO MODEL.
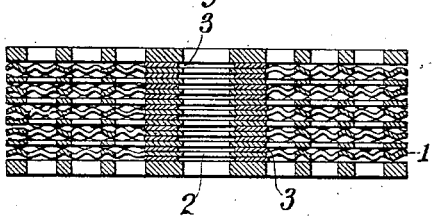
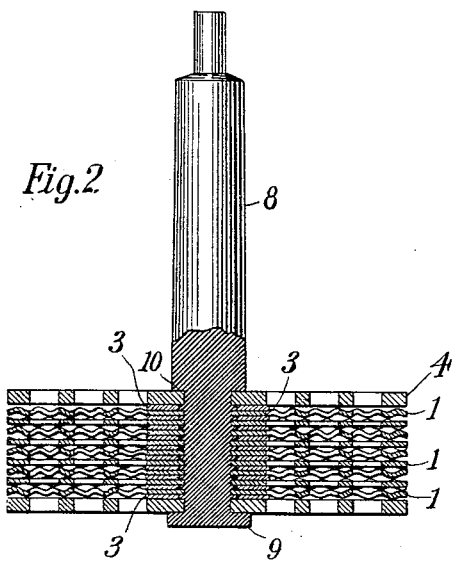
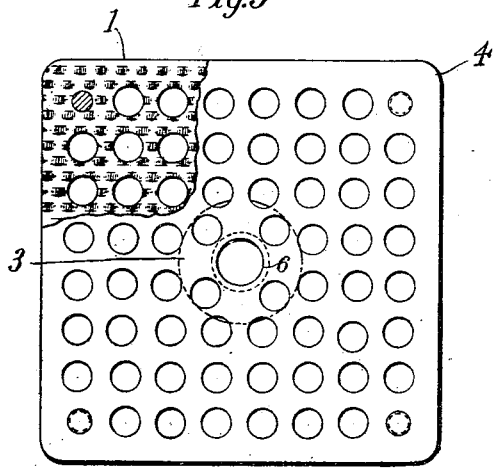
Witnesses:
Raphaël Netter
S.S. Dunham.
Louis Chronik, Inventor
by Kerr, Page & Cooper, Attys No. 733,696. Patented July 14, 1903.

UNITED STATES PATENT OFFICE.

LOUIS CHRONIK, OF NEW YORK, N. Y., ASSIGNOR TO UNITED STATES BATTERY COMPANY, OF BROOKLYN, NEW YORK, A CORPORATION OF NEW YORK.

BATTERY ELEMENT.

SPECIFICATION forming part of Letters Patent No. 733,696, dated July 14, 1903.

Application filed November 15, 1902. Serial No. 131,457. (No model.)

*To all whom it may concern:*

Be it known that I, LOUIS CHRONIK, a citizen of the United States, residing at New York, borough of Brooklyn, county of Kings, State of New York, have invented certain new and useful Improvements in Battery Elements, of which the following is a specification, reference being had to the drawings accompanying and forming part of the same.
In a well-known form of storage battery the secondary element is formed of a number of corrugated lead plates firmly clamped at right angles around a central vertical pillar or stem. While this form possesses many advantages, it presents a defect which it is the object of my invention to overcome—namely, the electrical connection of the plates to the stem. The clamp connection gives good results for a while; but after the battery has been in use for a time the thin edges of the plates adjacent the pillar are corroded by the action of the battery liquids, with the result that the contact at those points is seriously impaired or even totally destroyed. I have therefore devised the present invention, by which this injury to the contacting surfaces is entirely eliminated; and it consists, essentially, of an element formed of a plurality of plates having a stem or pillar cast in suitable openings in the plates.

Referring now to the drawings, Figure 1 shows in section a number of plates and interposed washers assembled. Fig. 2 is a similar view, but showing also the stem cast in position. Fig. 3 is a plan view of Fig. 2.

In making an element in accordance with my invention I take a lead plate 1, having an opening 2 of proper size, usually in the center. On this is placed a lead washer 3, having an opening slightly larger than the opening in the plate, the plate and washer being arranged with their openings concentric. A second plate is now placed on the washer, followed by as many plates and washers as desired. The whole is now firmly clamped together by means of stiff lead binding-plates 4 5, forming a bundle having therethrough a hole 6, Fig. 1, the walls of which present interstices between adjacent plates, as will be readily understood. The clamped plates are now placed in a suitable mold and melted lead is cast therein, the fluid metal penetrating the interstices between the plates. The plates 1 and pillar 8 are thus practically welded together, so that the corrosive battery solution cannot attack the edges of the plates contiguous to the stem, the pillar itself being formed by the casting operation. To further strengthen the entire structure, a head 9 and shoulder 10 may be formed on the pillar, as shown. Of course it is not necessary that the washers 3 be made of lead, as any suitable material may be used—such as wood, paperboard, &c.—the purpose of the washer being to separate the plates so that the molten metal can flow around the edges, and thus protect them from the action of the battery fluid.

It will now be seen that my device possesses the well-known advantages of the built-up element, but at the same time obviates the chief defect there presented, since the plates or sections are not only connected to the stem in such a manner as to insure perfect electrical contact, but also to protect the contact from the destructive effects of corrosion.

Having now fully described my invention, what I claim is—

A battery element comprising a plurality of plates having registered openings therethrough, interposed washers having openings larger than the openings in the plates and registering therewith, stiff binding-plates above and below the assembled plates and washers and having similar openings, and a pillar cast in the opening through the said plates, having a head and shoulder engaging the upper and lower binding-plates to hold the whole together, as and for the purposes set forth.

LOUIS CHRONIK.

Witnesses:
M. LAWSON DYER,
S. S. DUNHAM.